(12) United States Patent
Hirai et al.

(10) Patent No.: US 12,198,832 B2
(45) Date of Patent: Jan. 14, 2025

(54) ELECTRICALLY-INSULATING RESIN COMPOSITION AND ELECTRICAL INSULATOR

(71) Applicant: Showa Denko Materials Co., Ltd., Tokyo (JP)

(72) Inventors: Tomoki Hirai, Tokyo (JP); Shiori Tabata, Tokyo (JP); Seiichi Shike, Tokyo (JP); Shuusuke Ishii, Tokyo (JP)

(73) Assignee: Resonac Corporation, Tokyo (JP)

( * ) Notice: Subject to any disclaimer, the term of this patent is extended or adjusted under 35 U.S.C. 154(b) by 315 days.

(21) Appl. No.: 17/612,138

(22) PCT Filed: May 31, 2019

(86) PCT No.: PCT/JP2019/021738
§ 371 (c)(1),
(2) Date: Nov. 17, 2021

(87) PCT Pub. No.: WO2020/240823
PCT Pub. Date: Dec. 3, 2020

(65) Prior Publication Data
US 2022/0230778 A1  Jul. 21, 2022

(51) Int. Cl.
*H01B 3/30* (2006.01)
*C08K 3/36* (2006.01)
*C08K 5/521* (2006.01)
*C08L 79/08* (2006.01)

(52) U.S. Cl.
CPC .............. *H01B 3/306* (2013.01); *C08K 3/36* (2013.01); *C08K 5/521* (2013.01); *C08L 79/08* (2013.01); *C08L 2203/202* (2013.01)

(58) Field of Classification Search
CPC . H01B 3/30; H01B 3/306; C08K 3/36; C08K 5/521; C08L 79/08; C08L 2203/202
USPC ....................................................... 174/137 B
See application file for complete search history.

(56) References Cited

U.S. PATENT DOCUMENTS

| | | | |
|---|---|---|---|
| 2006/0240254 A1 | 10/2006 | Kikuchi et al. | |
| 2012/0168215 A1* | 7/2012 | Shiina | G03F 7/0047 427/510 |
| 2013/0037310 A1* | 2/2013 | Kimura | C08J 5/244 523/400 |

FOREIGN PATENT DOCUMENTS

| | | |
|---|---|---|
| CN | 101432134 A | 5/2009 |
| CN | 102732146 A | 10/2012 |
| CN | 105900183 A | 8/2016 |
| CN | 107710339 A | 2/2018 |
| EP | 1153971 A1 | 11/2001 |
| JP | 2000-063564 A | 2/2000 |
| JP | 2008-251295 A | 10/2008 |
| JP | 2001-307557 A | 11/2011 |
| JP | 2012-197367 A | 10/2012 |
| JP | 2015-084329 A | 4/2015 |
| JP | 2015-096577 A | 5/2015 |
| JP | 2015-185417 A | 10/2015 |

(Continued)

*Primary Examiner* — Tremesha W Burns
(74) *Attorney, Agent, or Firm* — FITCH, EVEN, TABIN & FLANNERY, LLP

(57) ABSTRACT

An electrically-insulating resin composition comprising a polyamide-imide resin, a silica fine particle and a dispersant having a phosphate ester group. This electrically-insulating resin composition can be used to provide an electrical insulator having excellent withstand voltage life characteristics against a surge voltage.

16 Claims, 2 Drawing Sheets

(56) References Cited

FOREIGN PATENT DOCUMENTS

| | | |
|---|---|---|
| JP | 2016-192324 A | 11/2016 |
| JP | 2016-195089 A | 11/2016 |
| JP | 2019-053880 A | 4/2019 |

\* cited by examiner

ELECTRICALLY-INSULATING RESIN COMPOSITION AND ELECTRICAL INSULATOR

CROSS-REFERENCE TO RELATED APPLICATIONS

This application is a U.S. national phase application filed under 35 U.S.C. § 371 of International Application No. PCT/JP2019/021738, filed May 31, 2019, designating the United states, which is hereby incorporated herein by reference in its entirety.

TECHNICAL FIELD

The present disclosure relates to an electrically-insulating resin composition which may form an electrical insulator having excellent withstand voltage life characteristics against a surge voltage and an electrical insulator which uses the electrically-insulating resin composition.

BACKGROUND ART

Recently, from the viewpoints of energy saving and variable-speed control, inverter control type electronic equipment has been widely used in various fields. Specifically, a high efficiency has been sought in control systems in the fields of hybrid vehicles and industrial motors. Therefore, an inverter drive has been used as a variable-speed device, and the miniaturization, the reduction in weight, the high heat resistance and the high voltage drive of such devices have been rapidly progressing.

In recent years, the development of elements capable of high-speed switching such as an Insulated Gate Bipolar Transistor (IGBT) has been progressing as the power device of an inverter drive. On the other hand, due to the surge voltage values increasing in accordance with the high-speed switching of power devices, instances in which insulation breakdown occurs early in motors and electric devices and the lifespans have become extremely short have become more frequent.

It has been indicated as one of the causes of the insulation breakdown that a partial discharge occurs when a high voltage is applied to a coil motor and the like due to a surge, and the insulating film of the electrical insulator deteriorates. Therefore, an electrically-insulating material which can suppress the deterioration of the insulating film due to partial discharge has been desired for electric devices and the like by the inverter drive in order to prolong the life of a motor.

On the other hand, since the work resistance, the heat resistance, the chemical resistance, the hydrolysis resistance and the like are excellent, a polyamide-imide resin has been used in various applications as an important electrically-insulating material. Specifically, in the field of automobile motors (including a hybrid automobile motor), in winding processing during the manufacturing of a motor, the windings are processed by stretching, bending, wear, etc. while applying a strong tension. Therefore, a work resistance having excellent flexibility and the like has been sought in a winding.

Further, a winding is often installed in the presence of transmission oil. Therefore, the winding which is not affected by the mission oil, and further, has resistance to hydrolysis by the water in the oil may be provided as the performance requirements for the winding which can be used in a motor. Furthermore, the winding which also has a heat resistance for withstanding use at high temperatures has been sought. From this point of view, polyamide-imide resins have become indispensable as electrically-insulating materials which can be used in s winding (specifically, an insulated wire).

From these points of view, various examinations were conducted towards the realization of an electrically-insulating material which can suppress the destructive deterioration by the partial discharge (hereinafter, referred to as partial discharge deterioration) of the insulating film, and which satisfies the typical performance requirements for an insulated wire such as work resistance, heat resistance, chemical resistance, hydrolysis resistance and the like.

For example, a resin composition comprising a polyamide-imide resin modified by a specific polybutadiene resin has been disclosed as an electrically-insulating material capable of suppressing partial discharge deterioration (Patent Document 1). Further, resin compositions comprising a resin such as polyamide-imide resin and an inorganic particle such as silica have been disclosed as other electrically-insulating materials (Patent Documents 2 to 4).

However, with respect to the increase of surge voltage values in recent years, it is difficult to obtain a sufficiently satisfactory withstand voltage life characteristics with the conventional electrically-insulating material. Therefore, an electrically-insulating material having a higher resistance to partial discharge deterioration than the conventional material and which can improve the withstand voltage life characteristics has been desired.

PRIOR ART DOCUMENTS

Patent Documents

Patent Document 1: JP 2015-84329 A
Patent Document 2: JP 2001-307557 A
Patent Document 3: JP 2012-197367 A
Patent Document 4: JP 2008-251295 A

SUMMARY OF THE INVENTION

Problems Invention Aims to Solve

Increasing the content of the inorganic particle may be provided as one method for increasing the partial discharge deterioration resistance of an insulating film formed from an electrically-insulating material comprising a resin such as a polyamide-imide resin and an inorganic particle such as silica, and improving the withstand voltage life characteristics of an electrical insulator. However, when the content of the inorganic particle in the electrically-insulating material is increased, the flexibility, the adhesion to the conductor, and the breakdown voltage characteristics of the insulating film tend to decrease. When the flexibility and the adhesion of the insulating film are low, the insulated wire having this kind of insulating film tends to have reduced insulation due to mechanical stress during winding processing. Further, when the breakdown voltage characteristics is low, the insulation breakdown of the insulating film is likely to occur not only when a partial discharge occurs. Furthermore, when the content of the inorganic particles in the electrically-insulating material is increased, an increase in the viscosity tends to occur and the storage stability tends to decrease.

For this reason, with respect to the electrically-insulating material comprising the conventional inorganic particle, improving the partial discharge deterioration resistance to improve the withstand voltage life characteristics, and improving the storage stability while maintaining the properties which are typically necessary in an insulating film of an insulated wire such as the flexibility, the adhesion, and the breakdown voltage characteristics has been desired.

Therefore, the present disclosure provides an electrically-insulating resin composition which, in addition to the flexibility, the adhesion, and the breakdown voltage characteristics, can form an insulating film has an excellent partial discharge deterioration resistance, and having an excellent storage stability. Further, the present disclosure provides an electrical insulator having a high insulation reliability using the electrically-insulating resin composition.

Means for Solution of the Problems

The present inventors performed keen examination with regards to the electrically-insulating resin composition comprising a polyamide-imide resin and an inorganic particle. As a result, the present inventors discovered that an electrically-insulating resin composition which could maintain the typical performance necessary in an insulating film of an insulated wire such as the flexibility, the adhesion and the breakdown voltage characteristics using a silica fine particle as the inorganic particle, and furthermore, using a specific dispersant, and increase the partial discharge deterioration resistance to improve the withstand voltage life characteristics, while further having excellent storage stability could be realized, and completed the present invention. Namely, the present invention relates to the embodiments described below. However, the present invention is not limited to the following embodiments.

One embodiment relates to an electrically-insulating resin composition having a polyamide-imide resin, a silica fine particle and a dispersant having a phosphate ester group. In the electrically-insulating resin composition, a blending amount of the dispersant having the phosphate ester group is preferably 5 to 20 parts by mass per 100 parts by mass of the silica fine particle.

One embodiment relates to an electrical insulator having a conductor and an insulating film formed using an electrically-insulating resin composition of the aforementioned embodiment. The conductor is preferably a metal wire.

Effects of the Invention

According to the present invention, an electrically-insulating resin composition which in addition to having the typical performance necessary in the insulating film of the insulated wire such as the flexibility, the adhesion, and the breakdown voltage characteristics, may form an insulating film having an excellent partial discharge deterioration resistance, and has an excellent storage stability can be provided. Further, an electrical insulator which uses the electrically-insulating resin composition and has a high insulation reliability can be provided.

EMBODIMENTS FOR CARRYING OUT THE INVENTION

Figure 1:
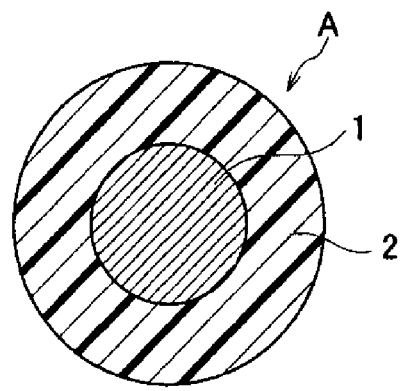
FIG. 1 is a schematic cross-sectional view illustrating one embodiment of an insulated wire.

Embodiments of the present invention will be described below in detail; however, the present invention is not limited to the following embodiments.

1. Electrically-insulating Resin Composition

One embodiment relates to an electrically-insulating resin composition having a polyamide-imide resin, a silica fine particle and a dispersant having a phosphate ester group. Each component will be described below.

Polyamide-imide Resin

A polyamide-imide resin is a resin having an amide bond and an imide bond in the molecule. The polyamide-imide resin is a resin obtained by the reaction of a monomer mixture containing an acid component ((hereinafter, referred to as acid component (a)) containing a tricarboxylic acid anhydride or a derivative thereof, and a diisocyanate compound or a diamine compound (hereinafter, referred to as component (b)). The electrically-insulating resin composition may include one polyamide-imide resin, or may include two or more polyamide-imide resins.

Acid Component (a)

The tricarboxylic acid anhydride used as the acid component (a) may be a trivalent carboxylic acid having an acid anhydride group which reacts with the isocyanate group or the amino group in component (b). In order to manufacture the polyamide-imide resin, a tricarboxylic acid anhydride or a derivative thereof can be used without specific limitation.

From the viewpoint of heat resistance, the tricarboxylic acid anhydride in the acid component (a) preferably has a configuration containing an aromatic group. In one embodiment, the acid component (a) preferably contains the tricarboxylic acid anhydride represented by the following Formula (I) or the following Formula (II). Thereamong, from the viewpoints of heat resistance and cost, a trimellitic acid anhydride is specifically preferable. The tricarboxylic acid anhydride represented by the following Formula (I) or the following Formula (II) may be used alone or two or more may be used in combination in accordance with the purpose.

[Formula 1]

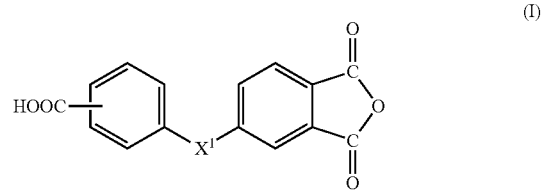

(I)

in the formula, $X^1$ represents —$CH_2$—, —CO—, —$SO_2$— or —O—.

[Formula 2]

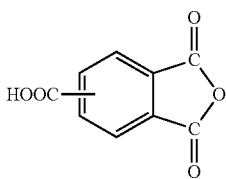

(II)

In another embodiment, the acid component (a) may further contain an acid component which is different from the tricarboxylic acid anhydride. For example, tetracarboxylic dianhydride may be further contained as a part of the acid component (a) in accordance with need. Specific examples of the tetracarboxylic dianhydride include pyromellitic dianhydride, 3,3',4,4'-benzophenone tetracarboxylic dianhydride, 3,3',4,4'-biphenyl tetracarboxylic dianhydride, 1,2,5,6-naphthalene tetracarboxylic dianhydride, 2,3,5,6-pyridine tetracarboxylic dianhydride, 1,4,5,8-naphthalene tetracarboxylic dianhydride, 3,4,9,10-perylene tetracarboxylic dianhydride, 4,4'-sulfonyldiplithalic dianhydride, m-terphenyl 3,3',4,4'-tetracarboxylic dianhydride (3,3'',4,4''-m-terphenyl tetracarboxylic dianhydride), 4,4'-oxydiphthalic dianhydride, 1,1,1,3,3,3-hexafluoro-2,2-bis(2,3- or 3,4-dicarboxyphenyl)propane dianhydride, 2,2-bis(2,3- or 3,4-dicarboxyphenyl)propane dianhydride, 2,2-bis[4-(2,3- or 3,4-dicarboxyphenoxy)phenyl]propane dianhydride, 1,1,1,3,3,3-hexafluoro-2,2-bis[4-(2,3- or 3,4-dicarboxyphenoxy)phenyl]propane dianhydride, 1,3-bis(3,4-dicarboxyphenyl)-1,1,3,3-tetramethyldisiloxane dianhydride, butanetetracarboxylic dianhydride, bicyclo-[2,2,2]-oct-7-ene-2:3:5:6-tetracarboxylic dianhydride, and the like.

Component (b)

The diisocyanate compound or the diamine compound is not specifically limited, and may be a compound having two isocyanate groups or amino groups in the molecule. In one embodiment, component (b) preferably contains an aromatic compound having an isocyanate group or an amino group represented by the following Formula (III), (IV) or (V).

[Formula 3]

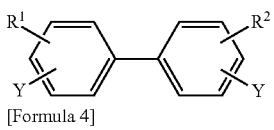

(III)

[Formula 4]

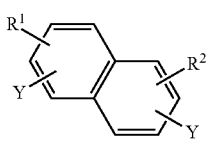

(IV)

[Formula 5]

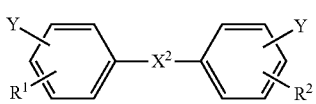

(V)

In the above formula, $R^1$ and $R^2$ independently represent hydrogen atom, an alkyl group, an alkoxy group, or a hydroxyl group. The alkyl group or alkoxy group is preferably C1 to 20, more preferably C1 to 15, and even more preferably C1 to 10. In the alkyl group or alkoxy group, at least one hydrogen atom may be substituted with a halogen atom such as a fluorine atom. In one embodiment, $R^1$ and $R^2$ independently are preferably hydrogen atom.

Y respectively represents an isocyanate group or an amino group.

$X^2$ represents —$CH_2$—, —$C(=O)$—, —$S(=O)$—, —$SO_2$—, —O—, —S—, or —$CR^3R^4$—. $R^3$ and $R^4$ independently represent the alkyl group or alkoxy group. The alkyl group or alkoxy group as previously described. In one embodiment, $R^3$ and $R^4$ are one or more substituents consisting selected from the group consisting of C1 to 10 alkyl group, trifluoromethyl group, trichloromethyl group, or phenyl group. In one embodiment, $X^2$ is preferably —$CH_2$—.

Specific examples of the aromatic diisocyanate compound or the aromatic diamine compound illustrated in the Formula (III), (IV) or (V) include 4,4'-diisocyanatediphenylmethane, 4,4'-diisocyanatebiphenyl, 3,3'-diisocyanatebiphenyl, 3,4'-diisocyanatebiphenyl, 4,4'-diisocyanate-3,3'-dimethylbiphenyl, 4,4'-diisocyanate-2,2'-dimethylbiphenyl, 4,4'-diisocyanate-3,3-diethylbiphenyl, 4,4'-diisocyanate-2,2'-diethylbiphenyl, 4,4'-diisocyanate-3,3'-dimethoxybiphenyl, 4,4'-diisocyanate-2,2'-dimethoxybiphenyl, 1,5-diisocyanatenaphthalene, 2,6-diisocyanatenaphthalene, 4,4'-diaminodiphenylmethane, 4,4'-diamino-biphenyl, 3,3'-diamino-biphenyl, 3,4'-diamino-biphenyl, 4,4'-diamino-3,3'-dimethylbiphenyl, 4,4'-diamino-2,2'-dimethylbiphenyl, 4,4'-diamino-3,3'-diethylbiphenyl, 4,4'-diamino-2,2'-diethylbiphenyl, 4,4'-diamino-3,3'-dimethoxybiphenyl, 4,4'-diamino-2,2'-dimethoxybiphenyl, 1,5-diaminonaphthalene, 2,6-diaminonaphthalene and the like. These may be used singly or in combinations of two or more, Further, examples of the diisocyanate compound or the diamine compound include aromatic diisocyanate compounds or aromatic diamine compounds such as tolylene diisocyanate, xylylene diisocyanate, 4,4'-diisocyanate diphenyl ether, 2,2-bis[4-(4'-isocyanatophenoxy)phenyl]propane, tolylene diamine, xylylene diamine, 4,4'-diaminodiphenyl ether, and 2,2-bis[4-(4'-aminophenoxy)phenyl]propane.

Furthermore, examples of the diisocyanate compound or the diamine compound include aliphatic or alicyclic diisocyanate compounds or diamine compounds such as hexamethylene diamine, 2,2,4-trimethylhexamethylene diamine, diaminoisophorone, bis(4-aminocyclohexyl)methane, trans-1,4-cyclohexanediamine, hydrogenated m-xylylenediamine, hexamethylene diisocyanate, 2,2,4-trimethylhexamethylene diisocyanate, isophorone diisocyanate, bis(4-isocyanatocyclohexyl)methane, trans-1,4-cyclohexanediisocyanate, and hydrogenated m-xylylene diisocyanate. However, when using an aliphatic or alicyclic compound, it is preferable to use together with the above stated aromatic diisocyanate compounds or aromatic diamine compounds. The use amount of the aliphatic or alicyclic compound, from a viewpoint such as the heat resistance of the resins which can be used, is preferably 50 mol % or less of the total amount of the diisocyanate compound or the diamine compound.

The above stated diisocyanate compound or diamine compound can be used together with a trifunctional or more polyisocyanate compound or polyamine compound.

In one embodiment, in consideration of the balance of the heat resistance, the solubility, the functional characteristics, and the cost aspect, 4,4'-diphenylmethanediisocyanate is particularly preferable as the diisocyanate compound or the diamine compound.

Further, a compound in which the isocyanate group is stabilized with a blocking agent may be used in order to prevent change over time in accordance with need. Examples of the blocking agent include, but are not specifically limited to alcohols, phenols, oximes and the like.

Blending Ratio of Acid Component (a) and Component (b)

When manufacturing the polyamide-imide resin, the ratio (the molar ratio of (b)/(a)) of the blending amount of component (b) (representing the diisocyanate compound or the diamine compound) with respect to the acid component (a) can be adjusted without specific limitation. When the molar ratio becomes too low, it tends to become difficult to increase the molecular weight of the resin. On the other hand, when the molar ratio is too high, the foaming reaction becomes intense, and, the residual unreacted components increase, and the stability of the resin tends to become poor.

Since it is easy to obtain the desired Mn and acid value in one embodiment, the molar ratio of the blending amount of component (b) with respect to 1 mol of acid component (a) is preferably 0.6 to 1.4, more preferably 0.7 to 1.3, and specifically preferably 0.8 to 1.2. The molar ratio of the blending amount is the value calculated as the ratio of the total molar number of the isocyanate group or the amino group of the diisocyanate compound or the diamine compound in component (b) relative to the total molar number of the carboxyl group, the acid anhydride group and the optionally included reactive hydroxyl group in the acid component (a).

The polyamide-imide resin can be synthesized, for example, according to the following methods.

(1) A method for mixing the acid component (a) with component (b) at once, and reacting to synthesize a polyamide-imide resin.
(2) A method for reacting the acid component (a) with an excess amount of component (b) to synthesize an amide-imide oligomer having an isocyanate group at the terminal, and subsequently, adding the acid component (a) and reacting to synthesize the polyamide-imide resin.
(3) A method for reacting an excess amount of the acid component (a) with component (b) to synthesize an amide-imide oligomer having an acid or an isocyanate group at the terminal, and subsequently, adding the acid component (a) and component (b) and reacting to synthesize the polyamide-imide resin.

Reaction Temperature and Reaction Time

In any of the methods, the reaction temperature is preferably in a range of 80 to 150° C. Further, the reaction time is determined by taking the desired number average molecular weight (Mn) to be obtained into consideration, but generally, 1 to 10 hours is preferable.

Solvent During the Reaction

The solvent (synthetic solvent) used when synthesizing the polyamide-imide resin is not specifically limited, but examples include polar solvents such as N-methyl-2-pyrrolidone, N,N-dimethylformamide, γ-butyrolactone, N,N'-dimethylpropyleneurea{1,3-dimethyl-3,4,5,6-tetrahydropyrimidin-2(1H)-one}, dimethyl sulfoxide, diethylene glycol dimethyl ether, triethylene glycol dimethyl ether, and sulfolane; aromatic hydrocarbon solvents such as xylene and toluene, and ketones such as methyl ethyl ketone, methyl isobutyl ketone and the like.

The use amount of the synthetic solvent is not specifically limited, but is preferably 50 to 180 parts by mass relative to 100 parts by mass of the blending amount of the acid component (a) and component (b), and more preferably 60 to 120 parts by mass. When the use amount of the synthetic solvent is adjusted to the aforementioned range, the occurrence of the foaming reaction during synthesis can be suppressed, and it is easy to further suitably adjust the time necessary for the synthesis.

Molecular Weight of Polyamide-imide Resin

In general, from the viewpoint of ensuring the strength of the coating film, the number average molecular weight (Mn) of the polyamide-imide resin which is used as the insulating material is preferably 5,000 or more, more preferably 10,000 or more, and even more preferably 12,000 or more. On the other hand, from the viewpoint of the workability during coating, the Mn of the polyamide-imide resin is preferably 100,000 or less, more preferably 70,000 or less, and even more preferably 50,000 or less.

While not specifically limited, in one embodiment, a polyamide-imide resin in which the Mn is 12,000 to 30,000 can be preferentially used in order to manufacture the polyamide-imide resin composition. The Mn of the polyamide-imide resin is preferably 12,000 to 20,000. When a polyamide-imide resin having the Mn within the aforementioned range was used, it tends to be easy to further increase the improvement effect of the dispersibility of the silica fine particle by use of the dispersant.

The Mn of the polyamide-imide resin can be adjusted by the amount of the raw materials charged, the reaction time and the like. For example, the Mn can be controlled by sampling during the resin synthesis and gel permeation chromatography (GPC) to measure the calibration curve of a standard polystyrene, and continue the reaction until the intended Mn is attained.

Further, in one embodiment, the polyamide-imide resin preferably has an acid value of 30 to 50 mgKOH/g. The acid value is more preferably 35 to 45 mgKOH/g. Here, the acid value represents the number of milligrams (mg) of KOH required to neutralize 1 g of the polyamide-imide resin, and means the acid value of the combination of the carboxyl group within the polyamide-imide resin and the carboxyl group obtained by the ring-opening of the acid anhydride group.

When the polyamide-imide resin having an acid value in the aforementioned range was used, it tends to be easy to facilitate the dissolution or the dispersion of the polyamide-imide resin in the mixed solvent which will be described later. Further, it tends to be easy to suppress the gelation over time of the finally obtained polyamide-imide resin composition. Furthermore, while not limited to any theory, it is considered that the dispersibility of the silica fine particle improves due to the interaction between the carboxyl group in the resin and the silica fine particle, which will be described later, in the resin.

Silica Fine Particle

Among the inorganic particles typically used in an electrically-insulating material, silica is preferable in the points of having excellent dispersibility in resin, and aggregation of the particles is unlikely to occur. Specifically, the silica fine particle is preferably mixed with the polyamide-imide resin.

In the description, "silica fine particle" means a silica (silica oxide) having an average primary particle size of 50 nm or less. The silica fine particle is not specifically limited as long as the average primary particle size is 50 nm or less, and a well-known silica fine particle can be used.

In the description, "average primary particle size" means the average particle size of an aggregated particle, that is, not a secondary particle size, but the average particle size of a single non-aggregated particle. The average primary particle size of the silica fine particle can typically be measured by a method using a laser diffraction grain size distribution measuring apparatus or a transmission electron microscope (TEM). For example, in a method which uses a TEM, first, the areas of the respective particle images are measured by the TEM for at least 100 particles randomly selected from among a composition or a dispersion. Subsequently, the average primary particle size is obtained by calculating the average value of each particle by a well-known statistical process assuming that the diameter of the circle which has the same area as the value of the obtained area is the particle size.

In one embodiment, from the viewpoints of film formability and adhesion, the average primary particle size of the silica fine particle is preferably 40 nm or less, more preferably 30 nm or less, and even more preferably 20 nm or less. on the other hand, from the viewpoint of the handleability, the average primary particle size of the silica fine particle is preferably 3 nm or more, more preferably 5 nm or more, and even more preferably 10 nm or more. In one embodiment, the average primary particle size of the silica fine particle may be in the range of 10 to 20 nm, and more preferably in the range of 10 to 15 nm.

The silica fine particle is expected to show the advantageous characteristics such as the improvement of the film formability and adhesion of an insulating film due to the particle size being small. On the other hand, when compared to a silica particle in which the average primary particle size exceeds 50 nm, the silica fine particle tends to cause secondary aggregation, and the dispersibility tends to decrease. With respect thereto, in the electrically-insulating resin composition of the aforementioned embodiment, it is easy to obtain an excellent dispersion stability using the dispersant having the phosphate ester group which will be described later.

From the viewpoint of increasing the dispersibility to the resin, the silica fine particle may be subjected to a treatment with a typical surface treatment agent such as a silane coupling agent. An alkoxy silane coupling agent may be provided as a specific example of a silane coupling agent.

Further, the silica fine particle may be used in the formation of a silica sol, and the solvent may even be replaced. Here, a silica sol means a dispersion in which a silica fine particle is dispersed in a dispersion medium, and has fluidity. The dispersion medium in the silica sol preferably has excellent compatibility with the polyamide-imide resin. Examples of the dispersion medium include N,N-dimethylacetamide, methyl ethyl isobutyl ketone, water, or methanol. In addition, a mixed solvent, etc., of xylene and butanol can be used. In one embodiment, the dispersion medium may be the same as the mixed solvent which will be described later.

While not specifically limited, in one embodiment, a silica sol is preferably used as the silica fine particle. For example, a silica sol containing N,N-dimethylacetamide can be suitably used as the dispersion medium. Generally, the silica particle having an average primary particle size of 50 nm or less tends to easily form a secondary aggregation, but when the silica sol was used, it is easy to maintain a good dispersibility, and it tends to suppress sedimentation and the like of the particles due to aggregation. Further, in the combination of the silica sol and the dispersant having the phosphate ester group which will be described later, a more excellent dispersion stability tends to occur.

Commercial products may even be used for the silica sol, but the silica sol can also be prepared according to a method known to a person having ordinary skill in the art. For example, a general method which disperses a powder into a liquid can be applied to the configuration of the silica sol. For example, a method in which the silica particles and the dispersion medium were mixed with other components such as a dispersant, and subsequently a dispersion treatment was performed using an ultrasonic method, a mixer method, a three-roll method, a ball mill method or the like. While not specifically limited, the blending amount of the silica fine particle in the silica sol may be in the range of 10 to 50 mass % based on the total mass of the silica sol, and more preferably, may be in the range of 20 to 40 mass %.

In the electrically-insulating resin composition of the aforementioned embodiment, the blending amount of the silica fine particle with respect to 100 parts by mass of the of the polyamide-imide resin is preferably 5 to 50 parts by mass. The blending amount of the silica fine particle is more preferably 10 to 40 parts by mass, and even more preferably 10 to 20 parts by mass. When the blending amount of the silica fine particle was adjusted to within the aforementioned range, it is easy to improve the partial discharge deterioration resistance while maintaining the typical properties necessary in an insulated wire. When a sol of the silica fine particles was used, the blending amount means the value calculated from the solid content of the silica fine particle contained in the sol. By adjusting the blending amount of the silica fine particle to the aforementioned range, it is possible to increase the partial discharge deterioration resistance without decreasing the characteristics of the insulating film such as the flexibility and the adhesion, and the withstand voltage life resistance can be easily improved.

In one embodiment of the electrically-insulating resin composition, the silica fine particles may even be used in combination with other inorganic particles in the range which maintains an excellent dispersibility. For example, the silica fine particles may even be used in combination with a silica in which the average primary particle size exceeds 50 nm. Further, metal oxides such as aluminum oxide (alumina), titanium oxide, magnesium oxide, or zirconium oxide may be provided as the inorganic particle other than the silica which may be used in combination. Other specific examples include clay, talc, barium sulphate, calcium carbonate and the like.

Dispersant Having Phosphate Ester Group

A dispersant having a phosphate ester group means a compound which can be obtained by a condensation reaction between a phosphoric acid or a polyphosphoric acid and the polymer compound having a hydroxyl group, and a well-known compound can be used as the phosphate ester dispersant.

Generally, a dispersant having an acidic group shows adsorption to the surface of an inorganic particle and can increase the dispersibility by suppressing the aggregation of the inorganic particle. In the electrically-insulating resin composition of the present embodiment, the dispersibility of the silica fine particle can be efficiently increased by use of the dispersant having the phosphate ester group on the silica fine particle. As is clear from the following example, it tends to be difficult to obtain an excellent dispersibility and withstand voltage life characteristics when the dispersant having a carboxylic acid group was used as the acidic group instead of the phosphate group.

The dispersant (hereinafter, referred to as the phosphate ester dispersant) having the phosphate ester group is constituted by a structural moiety (A) derived from a phosphate group in a phosphoric acid or a polyphosphoric acid and a polymer chain (B) which is ester bonded to at least a part of the phosphate group. The phosphate ester dispersant may have a structure in which the hydrogen atom of one hydroxyl group present in the phosphoric acid or the polyphosphoric acid is substituted with a polymer chain, or may have a structure in which the hydrogen atoms of two hydroxyl groups present in the phosphoric acid or the polyphosphoric acid are respectively substituted with polymer chains.

While not limited to any theory, it is considered that the electrically-insulating resin composition of the present embodiment may stabilize the dispersibility of the silica fine particle by the structural moiety (A) of the dispersant showing an excellent adsorption to the surface of the silica fine particle, and the polymer chain (B) repelling the silica fine particles due to the steric hindrance with the polyamide-imide resin. Namely, it is considered that a part of the phosphate ester dispersant improves the dispersibility by adsorbing to the surface of the silica fine particle, but it is assumed that the phosphate ester dispersant can improve the dispersibility of the silica fine particle by the aforementioned steric hindrance even if floating in the system.

While not specifically limited, the polymer chain (B) in a phosphate ester dispersant has a structure derived from the polymer compound having a hydroxyl group in the terminal and is represented by formula "B—OH". In one embodiment, the polymer chain (B) preferably has a structure derived from the polymer compound represented by the general formula "$CH_3$—$(X_1)_a$—$(OX_2)_b$—OH".

In the formula, $X_1$ is a divalent acid group, and may preferably be a C1 to 30 alkylene group or a C6 to 30 arylene group, or a combination thereof (such as an alkylene arylene), and a is an integer of 0 or 1.

$X_2$ is a C2 to 6 alkylene group, and b is an integer from 5 to 15. The alkylene group may be any of a straight-chain structure, a branched structure, and a cyclic structure, but a straight-chain structure is preferable.

The moiety of the alkylene oxide (OX2) may preferably be ethylene oxide, propylene oxide or butylene oxide.

While not specifically limited, in one embodiment, the phosphate ester dispersant may have a configuration in which the hydrogen atom of one or two hydroxyl groups present in the phosphoric acid or the polyphosphoric acid is substituted with a group represented by "R—$(CH_2CH_2O)_b$—". In the formula, R represents a C4 to 36 alkyl group or a phenyl group which may be substituted by an alkyl group, and b is an integer from 5 to 15.

The molecular weight of the polymer chain (B) moiety in the phosphate ester dispersant may be preferably 500 to 3,000, more preferably 700 to 2,000 and even more preferably 1,000 to 1,500. When the molecular weight of the polymer chain is within the aforementioned range, an excellent dispersion effect can be easily obtained, and an increase in viscosity and the like due to the interaction with the resin component can be easily suppressed.

In one embodiment, the acid value of the phosphate ester dispersant is preferably 50 mgKOH/g or more, more preferably 70 mgKOH/g or more, even more preferably 90 mgKOH/g or more, and most preferably 100 mgKOH/g or more. On the other hand, the acid value is preferably 240 mgKOH/g or less, more preferably 190 mg KOH/g or less, even more preferably 150 mgKOH/g or less, and most preferably 140 mgKOH/g or less. In one embodiment, the acid value of the phosphate ester dispersant may be in the range of 70 to 150 mgKOH/g, more preferably in the range of 90 to 140 mgKOH/g, and even more preferably in the range of 100 to 135 mgKOH/g. Here, the acid value means the number of milligrams (mg) of KOH required to neutralize 1 g of the phosphate ester dispersant.

The phosphate ester dispersant can be manufactured according to a well-known method using a polymer compound having a phosphoric acid or a polyphosphoric acid and a hydroxyl group, but can also be obtained as a commercial product. For example, product names "DISPERBYK-102" and "DISPERBYK-W-9010" manufactured by BYK-Chemie Japan K.K can be suitably used. These dispersants are compounds having an acid value of 100 to 135 mgKOH/g, and a molecular weight of the polymer chain moiety bonded to the phosphate group of 1,000 to 1,500. Thereamong, in addition to the improvement of the dispersibility, since an increase in the viscosity can be efficiently suppressed, an excellent storage stability can be easily obtained when the "DISPERBYK-W-9010" was used.

The blending amount of the phosphate ester dispersant in the electrically-insulating resin composition is not specifically limited, but from the viewpoint of efficiently improving the dispersibility of the silica fine particles, is preferably 5 parts by mass or more relative to 100 parts by mass of the silica fine particle (values in terms of the solid content), more preferably 7 parts by mass or more, and even more preferably 10 parts by mass or more. On the other hand, the upper limit of the blending amount of the phosphate ester dispersant is not specifically limited, but from the viewpoint of suppressing the decrease of the film characteristics due to the polyamide-imide resin and the silica fine particles, is preferably 20 parts by mass or less. In one embodiment, the blending amount of the phosphate ester dispersant is preferably 5 to 20 parts by mass relative to 100 parts by mass of the silica fine particle, more preferably 7 to 18 parts by mass, and even more preferably 10 to 15 parts by mass.

The storage stability of the electrically-insulating resin composition can be evaluated by the viscosity aging rate (%) before and after storage of the polyamide-imide resin composition (varnish). In one embodiment, when a set amount of the polyamide-imide resin composition in which the solid content is 10 to 50 was inserted in an airtight container and the airtight container was stored in a drier set at 25° C. for one month, the viscosity aging rate before and after storage is preferably equal to or less than the viscosity aging rate of the varnish which does not contain the silica fine particle.

In one embodiment, the change rate of viscosity over time of the varnish is preferably 20% or less, and more preferably 15% or less. However, when the initial viscosity of the electrically-insulating resin composition is too high, the handling tends to deteriorate even when the change rate of viscosity over time is low, when the initial viscosity is high. Therefore, the initial viscosity (Pa·s) of the electrically-insulating resin composition is preferably 3.0 or less, more preferably 2.7 or less, and even more preferably 2.5 or less. Therefore, the varnish has an initial viscosity within the aforementioned range, and the change rate of viscosity over time is more preferably 20% or less. When the phosphate ester dispersant was used for the silica fine particles, an electrically-insulating resin composition (varnish) having excellent handling and having an excellent storage stability can be easily constructed.

Mixed Solvent

In one embodiment, the electrically-insulating resin composition may contain the polyamide-imide resin, the silica fine particle, the phosphate ester dispersant, and further, a solvent (hereinafter, referred to as the mixed solvent) for mixing these components. The mixed solvent is preferably capable of dissolving the polyamide-imide resin, and may be the same as a synthetic solvent used when synthesizing the polyamide-imide resin. Therefore, in order to manufacture the electrically-insulating resin composition, the reaction solution obtained during the manufacturing of the polyamide-imide resin can also be used as is. In one embodiment, the synthetic solvent and the mixed solvent preferably contain N-methyl-2-pyrrolidone and/or N,N-dimethylacetamide.

The blending amount of the synthetic solvent and/or the mixed solvent in the electrically-insulating resin composition is not specifically limited. The polyamide-imide resin can be diluted with the synthetic solvent and/or mixed solvent, and the blending amount adjusted in order to obtain the viscosity suitable for the desired application. In one embodiment, the electrically-insulating resin composition may be in the form of an electrical insulating coating material (varnish) containing a polyamide-imide resin, a silica fine particle, a phosphate ester dispersant and a solvent. When the electrically-insulating resin composition is used as a varnish, generally, the solid content is preferably 10 to 50 mass % based on the total mass of varnish, and more preferably 20 to 40 mass %. By adjusting the solid content in the varnish to the aforementioned range, an excellent coating characteristic can be obtained, and the coating can be repeated so as to easily thicken the film. The aforementioned solid content may typically be the total amount of the polyamide-imide resin and the silica fine particle.

Other Components

The electrically-insulating resin composition may further contain additives such as a colorant in accordance with need. The blending amount of the additives are preferably adjusted to a range which does not decrease the film characteristics.

The electrically-insulating resin composition can be prepared by mixing and dispersing the polyamide-imide resin, the silica fine particle, the phosphate ester dispersant, and furthermore, the mixed solvent and other components such as the additives in accordance with need according to a well-known method. The mixing and dispersion treatment can be performed using a well-known mixing and dispersion apparatus such as a high speed mixer, a homomixer, a ball mill, a roll mill, or an ultrasonic wave diffusion apparatus. When two or more mixing and dispersion apparatuses are used in combination, a good dispersion state can be easily obtained.

In the preparation of the electrically-insulating resin composition, the phosphate ester dispersant is used in an embodiment mixed together with a polyamide-imide resin and silica fine particles. In another embodiment, the phosphate ester dispersant may be used in a form premixed together with the silica fine particles prior to the preparation of the electrically-insulating resin composition. The phosphate ester dispersant not only adheres to the surface of the silica fine particle, but may float in the system of the electrically-insulating resin composition.

2. Electrical Insulator

The electrically-insulating resin composition of the aforementioned embodiment can be suitably used as an electrically-insulating material for imparting an insulation property to various conductors. One embodiment relates to an electrical insulator having a conductor and an insulating film formed from the electrically-insulating resin composition of the aforementioned embodiment for imparting an insulation characteristic to the conductor. The insulating film can be formed by coating the electrically-insulating resin composition of the aforementioned embodiment on the conductor and baking.

Examples of the conductor include a metal wire such as a copper wire and other structures for which it is desirable to impart an insulation characteristic. In the electrical insulator, in addition to the insulating film formed from the electrically-insulating resin composition, the conductor may furthermore have an additional insulating film constituted from other electrically-insulating materials.

Conductor

Examples of the conductor include the metal wire which will be described later and the electrical and electronic components which can be used in an inverter control electric appliance and the like. The electrical and electronic components to which the insulating film formed from the electrically-insulating resin composition of the aforementioned embodiment is provided can, specifically, be useful for high voltage and inverter control.

In the electrical and electronic components to which a high voltage is applied and the electrical and electronic components which can be used in inverter control electric appliances, along with the increases in the surge voltage values in recent years, partial discharge deterioration occurs easily in the insulating film, and the withstand voltage life tends to be short. With respect thereto, the insulating film formed from the electrically-insulating resin composition of the aforementioned embodiment has an excellent partial discharge deterioration resistance, and accordingly, can be suitably used in surge countermeasure applications for electrical and electronic components.

When the electrically-insulating resin composition of the aforementioned embodiment is coated on a metal wire, an insulated wire (enamel wire) excellent in partial discharge deterioration resistance, satisfying the typical performance requirements such as the work resistance such as the flexibility, the heat resistance, the breakdown voltage characteristics, and having a high insulation reliability can be provided. Further, by use of the insulated wire of the aforementioned embodiment, the electrical and electronic components having a high resistance to insulation breakdown and having an excellent withstand voltage life can be provided. Additionally, insulation breakdown due to partial discharge is not limited to the insulating film of the insulated wire, but occurs even in insulating films such as interphase insulating paper for electric motors, insulating varnish covering motor coils, insulating wires for power equipment such as generators, transformers, and switching devices and filling mold insulation members, and thus, the electrically-insulating resin composition of the aforementioned embodiment can be used in order to construct these insulated parts.

Production Method of the Insulating Film

The method for coating the electrically-insulating resin composition of the aforementioned embodiment is not specifically limited, and a well-known technique in the technical field can be used. For example, when the electrically-insulating resin composition prepared as an electrical insulating material (varnish) is coated on an electric wire (metal wire), a method such as die coating and felt coating can be used.

The electrically-insulating resin composition of the aforementioned embodiment can form an insulating film by coating on the conductor to be coated, and subsequently drying and curing the coating film. The drying and curing of the coating film can be achieved by performing a heat treatment at a temperature of 260 to 520° C. for 2 seconds to several minutes. If the temperature during the heat treatment is too low, the solvent remains after the drying and curing of the coating film, and it is possible that the coating film characteristics decreases. Further, when the temperature during curing is not sufficiently high (for example, when the curing temperature is less than 260° C.), the drying and curing of the coating film may be insufficient. When the heating time is too short, the solvent tends to remain on the coating film and the coating film characteristics decreases. On the other hand, if the heating time is too long, time and energy are wasted and the production efficiency tends to decrease.

The drying and curing method (baking method) of the electrically-insulating resin composition coated on the metal wire (electric wire) can be performed in accordance with an ordinary method. Typically, a method which passes through a heat furnace after the electrically-insulating resin composition was coated on the electric wire may be provided. From the viewpoint of improving the insulation break down resistance of the insulating film consisting of the cured film formed by drying and curing, it is preferable to repeat the coating of the electrically-insulating resin composition several times to form the insulating film.

The insulating film may be a single layer structure or may be a multilayer structure. While the thickness of the entire insulating film is not specifically limited, in one embodiment, the thickness of the entire insulating film is preferably 20 to 200 μm, and more preferably 40 to 150 μm. If the coating film is too thin, the insulation characteristic is insufficient, and if the coating film is too thick, the conduction ratio decreases when formed into a coil, and the electric capacity decreases. Further, if the coating film is too thick, it is disadvantageous for the miniaturization and thinning.

Insulated Wire (Enamel Wire)

Figure 2:
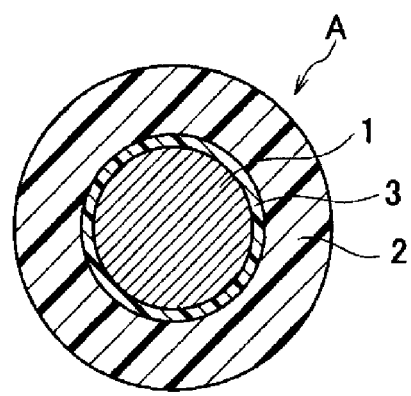
FIG. 2 is a schematic cross-sectional view illustrating another embodiment of the insulated wire.
Figure 3:
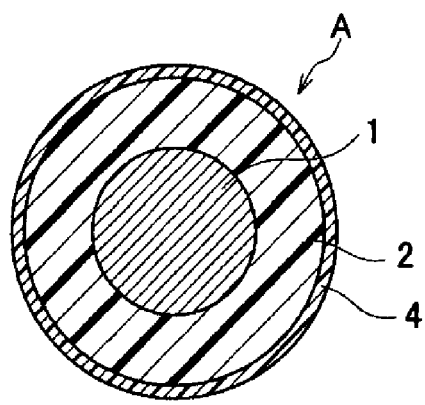
FIG. 3 is a schematic cross-sectional view illustrating another embodiment of the insulated wire.
Figure 4:
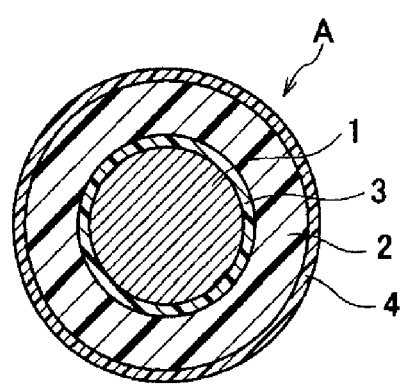
FIG. 4 is a schematic cross-sectional view illustrating another embodiment of the insulated wire.

Subsequently, an example of the electrical insulator will be specifically described with respect to the insulated wire. FIG. 1 is a schematic cross-sectional view illustrating one embodiment of the insulated wire. FIGS. 2 to 4 are schematic cross-sectional views illustrating other embodiments of an insulated wire. The insulated wire A in FIG. 1 has a conductor 1 and an insulating film 2 formed by coating the electrically-insulating resin composition of the aforementioned embodiment on the conductor 1 and baking.

A metal wire such as a copper can be provided as a specific example of the conductor 1. In one embodiment, the cross-sectional shape of the metal wire may be a circular shape as illustrated in FIG. 1. In another embodiment, the cross-sectional shape of the metal wire may also be square, rectangular, or a flat square shape.

The insulating film 2 may be a multilayer structure combined with another electrically-insulating material. In this case, the insulating film is a multilayer structure in which two or more layers of different electrically-insulating materials are laminated. In this kind of multilayer structure, the insulating film formed from the electrically-insulating resin composition of the aforementioned embodiment may be the innermost layer in contact with the conductor, may be the outermost layer in contact with the outside air, or may be an intermediate layer. Examples of another electrically-insulating material include a polyester imide resin, a polyurethane resin, a polyester resin, a polyimide resin, a polyamide-imide resin which is substantially free of inorganic particles and the like.

In one embodiment, the insulated wire A may be a structure having a primer layer 3 between the conductor 1 and the insulating coting film 2, as illustrated in FIG. 2. In another embodiment, the insulated wire A may be a structure having the conductor 1, the insulating film 2, and furthermore an overcoat layer 4 as illustrated in FIG. 3. Furthermore, in another embodiment, the insulated wire A may be a structure having the conductor 1, the primer layer 3, the insulating film 2 and the overcoat layer 4.

The primer layer and the overcoat layer are not specifically limited, but from the viewpoint of the compatibility of the resin with the insulating film 2, are preferably constituted from a polyamide-imide resin which is substantially free of inorganic particles. The primer layer and the overcoat layer may contain less than 5 parts by mass inorganic particles relative to 100 parts by mass of the polyamide-imide resin, but is preferably constituted from only the polyamide-imide resin. The polyamide-imide resin used to form the primer layer may be the same as the specific polyamide-imide resin which constitutes the electrically-insulating resin composition of the aforementioned embodiment, but it is not specifically limited thereto, and other polyamide-imide resins in which the Mn is higher may also be used. For example, in one embodiment, the Mn of the polyamide-imide resin used to form the primer layer and the overcoat layer may be 23,000 to 29,000.

As stated above, in the insulated wire A, the work resistance such as the flexibility, adhesion, the heat resistance, the breakdown voltage characteristics and the like are imparted and the insulation reliability is high by the conductor 1 being covered by the insulating film 2 formed from the electrically-insulating resin composition of the aforementioned embodiment. Therefore, the insulated wire of the aforementioned embodiment can be suitably used in the coil of a stator or a rotor. This kind of stator or rotor is installed in an inverter drive motor, another high-voltage drive motor or the like. Examples of an inverter drive motor include a hybrid automobile motor, an electric automobile motor, a hybrid diesel locomotive motor, an electric motorcycle motor, an elevator motor, a motor used for a construction machine and the like.

The coil constituted using the insulated wire of the aforementioned embodiment can provide a high insulation reliability in applications, and the prolongation of the life of the electronic equipment or the motor can be realized. This kind of effect is more effective, specifically, in inverter control in which a high voltage is applied. Further, since a sufficient breakdown voltage characteristics can be imparted even if using a thin insulating film, the electrically-insulating resin composition can also contribute to the miniaturization and the reduction in weight of electronic equipment, motors and the like.

EXAMPLES

The present invention will be described in detail below by examples. However, the present invention is not limited to the examples described below, and various modifications may be made without departing from the spirit of the present invention.

<1> Preparation of Polyamide-imide Resin 192.1 g (1.00 mol) of trimellitic acid anhydride, 250.3 g (1.00 mol) of 4,4'-diphenylmethanediisocyanate, and 362.0 g of N-methyl-2-pyrrolidone were charged in a flask equipped with a thermometer, a stirrer and a cooling tube. Subsequently, the temperature of these mixtures was gradually raised over approximately 6 hours to 130° C. in a dry nitrogen stream while paying attention to the rapid foaming of carbonic acid gas generated by the reaction, and furthermore held at a temperature of 130° C. for 4 hours to obtain a polyamide-imide resin solution. By diluting the polyamide-imide resin solution with N,N-dimethylacetamide (DMAC), and furthermore holding at a temperature of 200° C. for 2 hours, a polyamide-imide resin solution having a resin concentration (solid content) of 40% was prepared. When the polyamide-imide resin within the obtained solution was analyzed, the number average molecular weight was 21,000 and the acid value was 40 mgKOH/g.

The measurement of the number average molecular weight and the acid value of the polyamide-imide resin was carried out as follows.

Number Average Molecular Weight (Mn)

The conditions during measurement were as follows.
GPC apparatus: Hitachi L6000
Detector: Hitachi L4000 LTV
Wavelength: 270 nm
Data processing unit: ATT 8
Columns: Gelpack GL-S300MDT-5 (×2)
Column size: 8 mmφ×300 mm
Solvent: DMF/THF=1/1 (liter)+0.06M phosphoric acid+0.06M lithium bromide
Sample concentration: 5 mg/1 ml
Injection volume: 5 μl
Pressure: 49 kgf/cm$^2$ (4.8×10$^6$Pa)
Flow rate: 1.0 ml/minute

Acid Value 0.5 g of the polyamide-imide resin was collected, 0.15 g of 1,4-diazabicyclo[2,2,2]octane was added thereto, and furthermore, 60 g of N-methyl-2-pyrrolidone and 1 mL of ion exchange water were added, and stirred until the polyamide-imide resin was completely dissolved. The thus obtained solution was titrated by a potential-difference titration device using a 0.05 mol/L ethanolic potassium hydroxide solution.

<2> Preparation of Electrically-insulating Resin Composition

Example 1

By mixing and dispersing 100 parts by mass of the previously prepared polyamide-imide resin solution (DMAC was added to adjust the solid content to 37%), 12.3 parts by mass of a silica sol with 0.37 parts by mass of a phosphate ester dispersant at 60 to 70° C. for 1 hour, an electrically-insulating resin composition was obtained. The silica sol contains 30 mass % of silica having an average primary particle size of 11 nm, and the content of DMAC as a dispersion medium was 70 mass %. Further, product name "DISPERBYK-W-9010" (acid value 129 mg/KOH) manufactured by BYK-Chemie Japan K.K was used as the phosphate ester dispersant.

In the obtained insulative resin composition, the blending amount of the silica fine particle with respect to 100 parts by mass of the polyamide-imide (PAI) resin was 10 parts by mass. Further, the blending amount of the phosphate ester dispersant (described as dispersant A in Table 1) with respect to 100 parts by mass of the silica fine particle was 10 parts by mass.

Example 2

The electrically-insulating resin composition was prepared in the entirely same manner as Example 1 with the exception that the content of the silica sol in the preparation of the electrically-insulating resin composition of Example 1 was changed. Specifically, by mixing and dispersing 100 parts by mass of the previously prepared polyamide-imide resin solution (DMAC was added to adjust the solid content to 37%) and 18.5 parts by mass of the silica sol with 0.56 parts by mass of the phosphate ester dispersant at 60 to 70° C. for 1 hour, an electrically-insulating resin composition was obtained.

In the obtained electrically-insulating resin composition, the blending amount of the silica particles with respect to 100 parts by mass of the polyamide-imide resin was 15 parts by mass. Further, the blending amount of the phosphate ester dispersant with respect to 100 parts by mass of the silica fine particle was 10 parts by mass.

Example 3

The electrically-insulating resin composition was prepared in the entirely same manner as Example 2, with the exception that the content of the phosphate ester dispersant in the preparation of the electrically-insulating resin composition of Example 2 was changed. Specifically, by mixing and dispersing 100 parts by mass of the previously prepared polyamide-imide resin solution (DMAC was added to adjust the solid content to 37%) and 18.5 parts by mass of the silica sol with 1.1 parts by mass of the phosphate ester dispersant at 60 to 70° C. for 1 hour, an electrically-insulating resin composition was obtained.

In the obtained electrically-insulating resin composition, the blending amount of the silica particle with respect to 100 parts by mass of the polyamide-imide resin was 15 parts by mass. Further, the blending amount of the phosphate ester dispersant with respect to 100 parts by mass of the silica fine particle was 20 parts by mass.

Comparative Example 1

The electrically-insulating resin compositions were prepared in the entirely same manner as Example 2 with the exception that the phosphate ester dispersant in the preparation of the electrically-insulating resin composition of Example 2 was changed to a carboxyl group-containing dispersant (product name "FlOWLEN G-700" manufactured by Kyoeisha Chemical Co., Ltd., acid value 60 mg/KOH).

Specifically, by mixing and dispersing 100 parts by mass of the polyamide-imide resin solution (DMAC was added to adjust the solid content to 37%) and 18.5 parts by mass of the silica sol with 0.56 parts by mass of the carboxyl group-containing dispersant at 60 to 70° C. for 1 hour, an electrically-insulating resin composition was obtained.

In the obtained electrically-insulating resin composition, the blending amount of the silica particle with respect to 100 parts by mass of the polyamide-imide resin was 15 parts by mass. Further, the blending amount of the carboxyl group-containing dispersant (described as Dispersant B in Table 1) with respect to 100 parts by mass of the silica fine particle was 10 parts by mass.

Comparative Example 2

The electrically-insulating resin composition was prepared in the entirely same manner as Example 1 with the exception that the phosphate ester dispersant in the preparation of the electrically-insulating resin composition of Example 1 was not used. Specifically, by mixing and dispersing 100 parts by mass of the polyamide-imide resin solution (DMAC was added to adjust the solid content to 37%) with 2.3 parts by mass of silica sol 1 at 60 to 70° C. for 1 hour, an electrically-insulating resin composition was obtained.

In the obtained electrically-insulating resin composition, the blending amount of the silica particles with respect to 100 parts by mass of the polyamide-imide resin was 10 parts by mass.

Comparative Example 3

In the preparation of the electrically-insulating resin composition of Example 2, all of the electrically-insulating resin compositions were prepared in the same manner as Example 2 with the exception that the phosphate ester dispersant was not used. Specifically, by mixing and dispersing 100 parts by mass of the polyamide-imide resin solution (DMAC was added to adjust the solid content to 37%) with 18.5 parts by mass of the silica sol at 60 to 70° C. for 1 hour, an electrically-insulating resin composition was obtained.

In the obtained electrically-insulating resin composition, the blending amount of the silica particles with respect to 100 parts by mass of the polyamide-imide resin was 15 parts by mass.

Comparative Example 4

DMAC was further added to the previously prepared polyamide-imide resin solution (DMAC was added to adjust the solid content to 37%) to prepare an electrically-insulating resin composition free of the silica sol and the phosphate ester dispersant (solid content 34%).

<3> Evaluation of Electrically-insulating Resin Composition

<3-1> Varnish Characteristics

Storage Stability

The viscosity aging rate (%) before and after being stored at 25° C. for one month was calculated in accordance with the following procedures for the electrically-insulating resin compositions (varnishes) of Examples 1 to 3 and Comparative examples 1 to 4.

First, the viscosity was measured prior to storage of the polyamide-imide resin composition (varnish). Subsequently, a set amount of the resin composition (varnish) was placed in an airtight container, and the viscosity was measured after this airtight container was stored in a drier set to 25° C. for one month. The viscosity aging rate was calculated from the respective measurement values in accordance with the following (Formula 1).

$$\text{Change rate of viscosity over time}(\%)=(V2-V1)/V1\times 100 \quad \text{(Formula 1)}$$

In Table 1, "V1" represents the initial viscosity measured prior to storage. "V2" represents the viscosity measured after storage at 25° C. for one month.

Note that, these viscosity measurements were performed in accordance with JIS C 2103, using a B-type viscometer, under conditions including a temperature of 25° C., a No. 3 rotor, and a rotational rate of 30 rpm. Table 1 illustrates the values obtained by the viscosity measurements.

<3-2> Insulated Wire Characteristics (Insulating Film Characteristics)

The electrically-insulating resin compositions obtained in Examples 1 to 3 and Comparative examples 1 to 4 were coated on a 1.0 mm diameter copper wire, and subsequently baked, to produce an insulated wire having an insulating film with a film thickness of 0.034 mm.

The measurement conditions and the method for measuring the film thickness of the insulating film are as follows.

Coating and Baking Conditions

Baking furnace: Hot air type vertical furnace (Furnace length: 5 m)
Number of coatings: Die drawing 8 times (coating and baking were repeated 8 times)
Furnace temperature: Inlet (evaporation zone)/Outlet (curing zone)=320° C./430° C.
Line speed: 16 m/minute Measurement of Insulating Film Thickness The film thickness of the insulated wire was obtained by measuring the diameter (D1) of the insulated wire using a micrometer, and subsequently, measuring the diameter (D2) of the conductor after baking and removing the film, and halving the difference between D1 and D2.

Each characteristic of the insulating film of the obtained insulated wire was tested and evaluated by the following methods. The results are illustrated in Table 1.

(1) Withstand Voltage Life Characteristics (Partial Discharge Deterioration Resistance)

Two wound samples specified in JIS C3216-5 were prepared using the previously prepared insulated wire. Subsequently, a 20 kHz rectangular wave AC voltage was applied to the sample under the conditions of a measurement temperature of 155±3° C. and a pulse voltage of 3000 V, and the time until the sample underwent insulation breakdown was measured.

A withstand voltage life of 5 hours or more is within a sufficiently practicable range. However, the withstand voltage life is preferably 20 hours or more, and more preferably 40 hours or more.

(2) Flexibility

The flexibility was measured based on JIS C3216-3. Table 1 illustrates the diameter where cracks cannot be verified when the previously prepared insulated wire was wound with a 20% elongation, and the insulating film was examined visually. A 2-fold diameter where cracks cannot be observed is within a sufficiently practicable range, and a 3-fold diameter or more is undesirable from a practical standpoint.

(3) Adhesion

After baking in accordance with JIS C3216-3, the insulating film which had been left standing for one day or more was twisted at a rotation speed: 100 rotations/minute, and the number of rotations until the film peeled was measured. The number of rotations of 80 rotations or more is within a sufficiently practicable range, and the number of rotations less than 80 is undesirable from a practical standpoint.

(4) Softening Resistance (Heat Resistance)

The previously produced insulated wire was used to measure the softening resistance in accordance with JIS C3216-6. A softening temperature of 400° C. or more is within a sufficiently practicable range, and less than 400° C. is undesirable from a practical standpoint. The softening temperature is preferably 450° C. or more, and more preferably 480° C. or more.

(5) Breakdown Voltage Characteristics

The previously produced insulated wire was used to measure the breakdown voltage in accordance with JIS C3216-5. A breakdown voltage of 9 kV or more is within a sufficiently practicable range. A breakdown voltage of 10 kV or more is preferable, and 11 kV or more is more preferable.

Each evaluation result is shown in Table 1. In Table 1, the dispersant A represents a phosphate ester dispersant, and the dispersant B represents a carboxyl group-containing dispersant. The blending amount of the dispersant illustrates the blending amount(parts by mass) of the dispersant with respect to 100 parts by mass of the silica fine particle. The blending amount of the silica fine particle illustrates the blending amount (parts by mass) of the silica fine particle with respect to 100 parts by mass of the polyamide-imide resin. Further, the solid content of the varnish illustrates the value calculated from the total mass of the polyamide-imide resin, the silica fine particle and the dispersant with respect to the total mass of the varnish.

As illustrated in Table 1, with respect to Comparative examples 1 to 4, it is understood that the electrically-insulating resin compositions obtained in Examples 1 to 3 have a low viscosity aging rate and an excellent storage stability due to the use of a phosphoric acid ester dispersant. Further, the insulated wire having the insulating film formed from the electrically-insulating resin compositions obtained in Examples 1 to 3 have a withstand voltage life which is greatly improved over the insulated wires obtained in Comparative examples 1 to 4, and are understood to be excellent even in the typical necessary properties with respect to the other insulating films. Specifically, from the comparison with Comparative example 1 which used a dispersant having a carboxyl group, it is understood that, due to the combination of the specific dispersant which is a phosphate ester dispersant and the silica fine particle, the withstand voltage life can be improved in Examples 1 to 3 corresponding to the embodiments of the present invention without reductions in the typical required characteristics for an insulating film such as the adhesion, the flexibility and the breakdown voltage even in an electrically insulating material to which silica is added.

Therefore, according to the present invention, an electrically-insulating resin composition suitable as the electrically-insulating material which forms the insulating film can be provided, and this kind of electrically-insulating resin composition can be used to provide the electrical insulator having an excellent withstand voltage life. Specifically, the electrically-insulating resin composition according to the present invention is useful for the improvement of the long-term reliability of an inverter drive motor whose frequency and voltage progressively increase.

The invention claimed is:

1. An electrically-insulating resin composition comprising a polyamide-imide resin, silica fine particles and a dispersant having a phosphate ester group, wherein an average primary particle size of the silica fine particles is 50 nm or less, and a blending amount of the silica fine particles with respect to 100 parts by mass of the of the polyamide-imide resin is 5 to 40 parts by mass.

2. The electrically-insulating resin composition according to claim 1, wherein a blending amount of the dispersant having the phosphate ester group is 5 to 20 parts by mass per 100 parts by mass of the silica fine particles.

TABLE 1

| | Item | Example 1 | Example 2 | Example 3 | Comparative example 1 | Comparative example 2 | Comparative example 3 | Comparative example 4 |
|---|---|---|---|---|---|---|---|---|
| Components | Dispersant | A | A | A | B | None | None | None |
| | Blending amount of dispersant | 10 | 10 | 20 | 10 | 0 | 0 | 0 |
| | Blending amount of silica fine particle | 10 | 15 | 15 | 15 | 10 | 15 | 0 |
| | PAI solid content concentration before mixing (%) | 37 | 37 | 37 | 37 | 37 | 37 | 37 |
| Varnish property | Initial viscosity (Pa · s) | 2.5 | 2.3 | 2.0 | 1.7 | 2.0 | 1.5 | 1.7 |
| | Viscosity after one month (Pa · s) | 2.8 | 2.6 | 2.5 | 2.2 | 2.5 | 1.8 | 2.1 |
| | Viscosity aging rate (%) | 12 | 13 | 12 | 29 | 22 | 23 | 24 |
| | Solid content (%) | 36 | 36 | 36 | 36 | 36 | 36 | 34 |
| Insulating film property | Withstand voltage life (hours) | 59 | 57 | 54 | 24 | 31 | 51 | 0.01 |
| | Flexibility (20% elongation) | 2-fold diameter | 1-fold diameter | 1-fold diameter | 3-fold diameter | 2-fold diameter | 2-fold diameter | 2-fold diameter |
| | Adhesion (Number of rotations) | 85 | 101 | 100 | 100 | 100 | 100 | 100 |
| | Softening resistance (° C.) | >480 | >480 | >480 | >480 | >480 | >480 | 460 |
| | Breakdown voltage (kV) | 11.8 | 12.6 | 12.1 | 13.0 | 10.3 | 12.1 | 10.6 |

3. An electrical insulator comprising a conductor and an insulating film formed using the electrically-insulating resin composition according to claim 1.

4. The electrical insulator according to claim 3, wherein the conductor is a metal wire.

5. The electrically-insulating resin composition according to claim 1, wherein an acid value of the dispersant having the phosphate ester group is in the range of 70 to 150 mgKOH/g.

6. The electrically-insulating resin composition according to claim 1, wherein the average primary particle size of the silica fine particles is 40 nm or less.

7. The electrically-insulating resin composition according to claim 1, wherein the average primary particle size of the fine particles is 30 nm or less.

8. The electrically-insulating resin composition according to claim 1, wherein the average primary particle size of the silica fine particles is 20 nm or less.

9. The electrically-insulating resin composition according to claim 1, wherein the average primary particle size of the silica fine particles is 3 nm or more.

10. The electrically-insulating resin composition according to claim 1, wherein the average primary particle size of the silica fine particles is 5 nm or more.

11. The electrically-insulating resin composition according to claim 1, wherein the average primary particle size of the silica fine particles is 10 nm or more.

12. The electrically-insulating resin composition according to claim 1, wherein the average primary particle size of the silica fine particles is 10 to 20 nm.

13. The electrically-insulating resin composition according to claim 1, wherein the average primary particle size of the silica fine particles is 10 to 15 nm.

14. The electrically-insulating resin composition according to claim 1, wherein the average primary particle size of the silica fine particles is less than 50 nm.

15. The electrically-insulating resin composition according to claim 1, wherein blending amount of the silica fine particles with respect to 100 parts by mass of the of the polyamide-imide resin is 10 to 40 parts by mass.

16. The electrically-insulating resin composition according to claim 1, wherein blending amount of the silica fine particles with respect to 100 parts by mass of the of the polyamide-imide resin is 10 to 20 parts by mass.

* * * * *